United States Patent
Ekin et al.

(10) Patent No.: US 10,199,892 B2
(45) Date of Patent: Feb. 5, 2019

(54) SPOKE PERMANENT MAGNET ROTOR

(71) Applicant: ARCELIK ANONIM SIRKETI, Istanbul (TR)

(72) Inventors: Cihad Ekin, Istanbul (TR); Emin Gultekin Sonmez, Istanbul (TR); Yakup Imat, Istanbul (TR); Hakan Dogan, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 26 days.

(21) Appl. No.: 14/648,840

(22) PCT Filed: Nov. 8, 2013

(86) PCT No.: PCT/EP2013/073406
§ 371 (c)(1),
(2) Date: Jun. 1, 2015

(87) PCT Pub. No.: WO2014/082839
PCT Pub. Date: Jun. 5, 2014

(65) Prior Publication Data
US 2015/0303751 A1 Oct. 22, 2015

(30) Foreign Application Priority Data
Nov. 30, 2012 (TR) ............... a 2012 13948

(51) Int. Cl.
*H02K 1/27* (2006.01)
*H02K 1/28* (2006.01)
*H02K 1/30* (2006.01)

(52) U.S. Cl.
CPC ............. *H02K 1/2773* (2013.01); *H02K 1/28* (2013.01); *H02K 1/30* (2013.01)

(58) Field of Classification Search
CPC ........... H02K 1/2773; H02K 1/28; H02K 1/30
(Continued)

(56) References Cited

U.S. PATENT DOCUMENTS 4,445,062 A 4/1984 Glaser
4,631,807 A 12/1986 Kawada et al.
(Continued)

FOREIGN PATENT DOCUMENTS

CN 101032067 A 9/2007
CN 102035281 A 4/2011
(Continued)

OTHER PUBLICATIONS

International Search Report of WO 2014/082893A1 ( and references cited therein) and Written Opinion of International Searching Authority.
(Continued)

*Primary Examiner* — Alex W Mok
(74) *Attorney, Agent, or Firm* — Kilpatrick Townsend & Stockton LLP

(57) ABSTRACT

The present invention relates to a spoke-type permanent magnet rotor (1) used in brushless direct current electric motors (12), forming the rotating part inside the stator (13) that forms the stationary part thereof and having an air gap (14) between the inner surface of the stator (13) and itself, comprising a cylindrical core (2) produced from ferromagnetic laminations or ferromagnetic powder metal, a shaft (3) fixed to the core (2) and forming the rotational axis of the rotor (1), a hub (5) disposed at the center of the core (2) and having a shaft hole (4) that bears the shaft (3), more than one pole segment (6) disposed all around the hub (5), more than one magnet slot (7) disposed between the pole segments (6), more than one magnet (8) tangentially magnetized, placed in the magnet slots (7) and extending outwards in the radial direction, and two end rings (9) produced from non-magnetic materials such as aluminum and plastic and fixed on the front and rear planar surfaces of the core (2) by the injection molding method.

6 Claims, 5 Drawing Sheets

Figure 1:
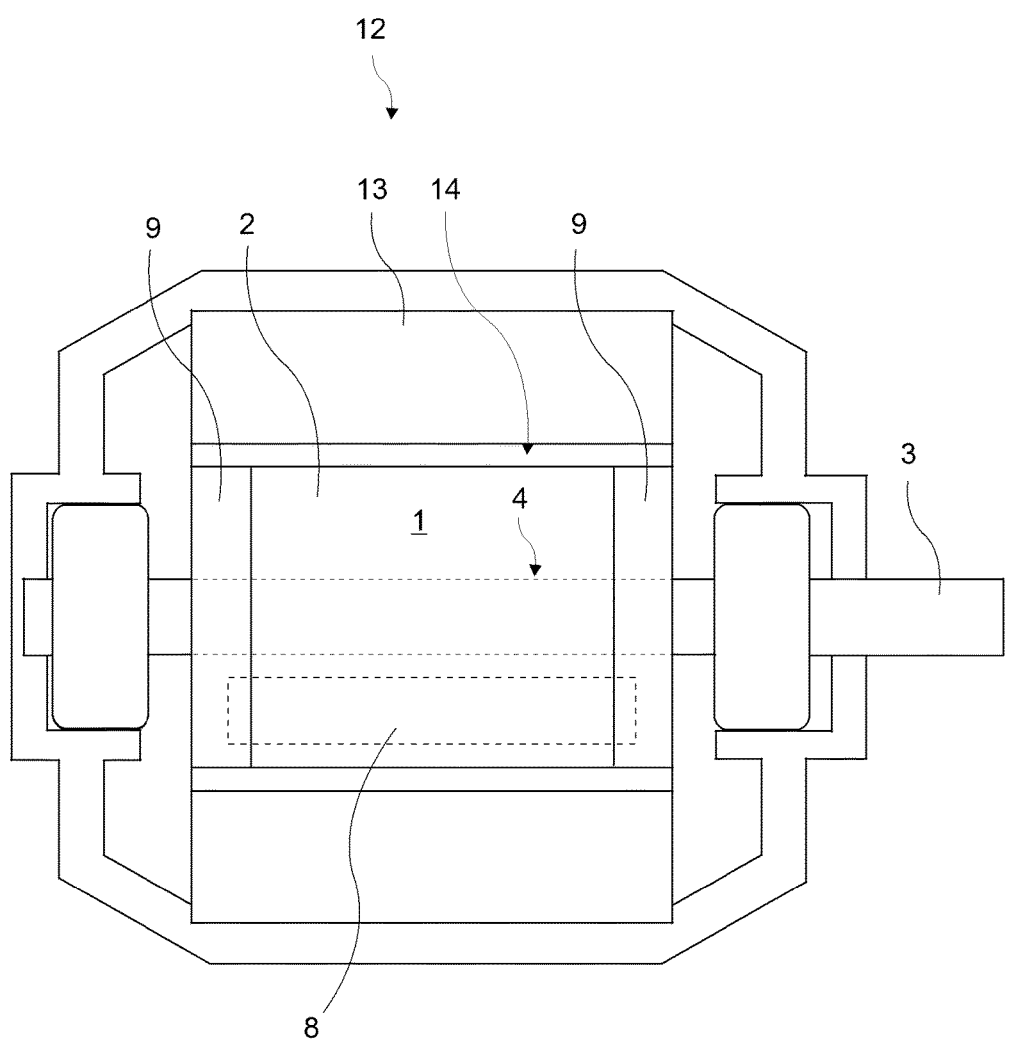

(58) Field of Classification Search
USPC .................. 310/43, 156.12, 156.22, 156.53
See application file for complete search history.

(56) References Cited

U.S. PATENT DOCUMENTS

| | | | |
|---|---|---|---|
| 4,864,175 A | 9/1989 | Rossi | |
| 4,954,736 A | 9/1990 | Kawamoto et al. | |
| 5,200,662 A * | 4/1993 | Tagami | H02K 1/2773 310/114 |
| 5,463,262 A | 10/1995 | Uchida | |
| 5,990,592 A | 11/1999 | Miura et al. | |
| 6,703,741 B1 | 3/2004 | Ifrim | |
| 6,987,342 B2 | 1/2006 | Hans | |
| 7,148,598 B2 | 12/2006 | Ionel et al. | |
| 7,151,336 B2 | 12/2006 | Yokochi et al. | |
| 7,196,446 B2 | 3/2007 | Hans | |
| 7,474,028 B2 | 1/2009 | Shim et al. | |
| 8,018,110 B2 | 9/2011 | Alexander et al. | |
| 9,362,792 B2 | 6/2016 | Figgins et al. | |
| 2004/0004407 A1 | 1/2004 | Laurent et al. | |
| 2005/0093391 A1 | 5/2005 | McMullen et al. | |
| 2006/0061227 A1 | 3/2006 | Heideman | |
| 2006/0202580 A1 * | 9/2006 | Lee | H02K 1/2786 310/156.45 |
| 2006/0220485 A1 | 10/2006 | Shim et al. | |
| 2007/0085437 A1 | 4/2007 | Heideman | |
| 2007/0252469 A1 | 11/2007 | Nishiura et al. | |
| 2009/0096308 A1 | 4/2009 | Staudenmann | |
| 2009/0096309 A1 * | 4/2009 | Pabst | H02K 1/2773 310/156.12 |
| 2009/0284094 A1 | 11/2009 | Horng et al. | |
| 2011/0121668 A1 * | 5/2011 | Condamin | H02K 1/2773 310/51 |
| 2011/0204740 A1 | 8/2011 | Vedy et al. | |
| 2012/0038237 A1 * | 2/2012 | Li | H02K 1/146 310/156.45 |
| 2012/0112591 A1 | 5/2012 | Feuerrohr et al. | |
| 2012/0326548 A1 * | 12/2012 | Nonaka | H02K 1/2773 310/156.19 |
| 2013/0187506 A1 * | 7/2013 | Lee | H02K 1/278 310/156.12 |
| 2015/0061441 A1 | 3/2015 | Figgins et al. | |
| 2015/0295460 A1 | 10/2015 | Ekin et al. | |
| 2015/0318744 A1 | 11/2015 | Ekin et al. | |

FOREIGN PATENT DOCUMENTS

| | | |
|---|---|---|
| CN | 102111025 A | 6/2011 |
| CN | 102124633 A | 7/2011 |
| CN | 102377257 A | 3/2012 |
| DE | 10219190 A | 11/2003 |
| DE | 102007024406 A1 | 11/2008 |
| DE | 102009045101 A1 | 4/2011 |
| DE | 102010061778 A1 | 5/2012 |
| DE | 102010061784 A1 | 5/2012 |
| DE | 102010064259 A1 | 6/2012 |
| EP | 0086272 B1 | 4/1986 |
| EP | 0582721 B1 | 5/1997 |
| EP | 0872944 A1 | 10/1998 |
| EP | 1557928 A1 | 7/2005 |
| EP | 1619770 A2 | 1/2006 |
| EP | 2403109 A2 | 1/2012 |
| JP | S6135501 A | 2/1986 |
| JP | S6356138 A | 3/1988 |
| JP | S63213444 A | 9/1988 |
| JP | H05244741 A | 9/1993 |
| JP | H0847190 A | 2/1996 |
| JP | 2000116044 A | 4/2000 |
| JP | 2001119877 A | 4/2001 |
| JP | 2001204146 A | 7/2001 |
| JP | 2003134705 A | 5/2003 |
| JP | 2003324925 A | 11/2003 |
| KR | 20130027417 A | 3/2013 |
| WO | 2012022731 A2 | 2/2012 |

OTHER PUBLICATIONS

International search report and written opinion, dated Feb. 18, 2015, of International Application No. PCT/EP2013/073398; 7 pgs.

International search report and written opinion, dated May 6, 2015, of International Application No. PCT/EP2013/073415; 8 pgs.

Non-Final Office Action dated Jan. 18, 2017, of U.S. Appl. No. 14/648,817; 25 pgs.

Non-Final Office Action dated Feb. 27, 2017, of U.S. Appl. No. 14/648,858; 8 pgs.

Final Office Action dated Aug. 4, 2017, of U.S. Appl. No. 14/648,817; 23 pgs.

Final Office Action dated Jul. 25, 2017, of U.S. Appl. No. 14/648,858; 22 pgs.

Non-Final Office Action dated Dec. 1, 2017, of U.S. Appl. No. 14/648,858; 17 pages.

Non-Final Office Action dated Nov. 30, 2017, of U.S. Appl. No. 14/648,817; 28 pages.

Final Office Action dated Apr. 25, 2018, of U.S. Appl. No. 14/648,858; 21 pages.

* cited by examiner

SPOKE PERMANENT MAGNET ROTOR

The present invention relates to a spoke permanent magnet rotor used in brushless direct current motors.

The developments and regulations in the field of energy efficiency have increased the demand for high-efficiency electric motors. Spoke-type rotors comprise more than one magnet placed between the pole segments forming the rotor core and the magnets extend in the radial direction around the rotor shaft towards the outer periphery of the rotor core. The magnets are tangentially magnetized with respect to their thickness and the magnetic flux generated by the magnets is collected on the pole pieces between which the magnets are placed. In spoke-type rotors, the magnetic flux density in the air gap between the stator and rotor, in other words the amount of the useful flux that provides the rotation of the rotor at the desired speed and torque is increased as compared to other magnet rotors. Despite the said advantages of spoke-type rotors, the mechanical structure of the core is weakened and the resistance of the rotor to centrifugal forces decreases due to the magnets extending from the center outwards in the radial direction and which are positioned close to each other. Furthermore, an increase in flux leakages is observed.

In the United States Patent Application No. US2007085437, a spoke permanent magnet rotor used in electric motors and the production method thereof are explained.

The aim of the present invention is the realization of a spoke-type permanent magnet rotor wherein the resistance thereof to centrifugal forces is increased and the flux leakages are decreased.

The spoke-type rotor realized in order to attain the aim of the present invention, explicated in the first claim and the respective claims thereof and forming the rotating portion in the stator in a brushless direct current motor, comprises a ferromagnetic core, a shaft forming the rotational axis thereof, a hub bearing the shaft at the center of the core, pole segments disposed around the hub, magnets placed in the magnet slots between the pole segments, and end rings produced from non-magnetic materials such as plastic or aluminum and fixed on the front and rear surfaces of the core by the injection molding method. The length of the magnets in the axial direction is longer than the length of the core (the length of the magnet slots) and the ends of the magnets extend outside the front and rear planar surfaces of the core and are embedded into the plastic end rings on the said surfaces.

In an embodiment of the present invention, the rotor comprises magnet slots narrowing from the hub outwards in the radial direction. The magnets placed in the magnet slots are also in trapezoid form, narrowing outwards in the radial direction.

In another embodiment of the present invention, the rotor comprises oblong or elliptic holes with rounded edges, that longitudinally hollow each pole segment by passing through the pole segment in the axial direction, of which the cross-sectional length in the radial direction is more than its width. Thanks to the rounded edges of the holes, plastic bars are injected into the holes without leaving gaps and a cage structure with high mechanical resistance is obtained in the core.

The resistance of the rotor of the present invention to centrifugal forces is increased; magnetic flux leakages are decreased and the performance of the motor is increased.

Figure 2:
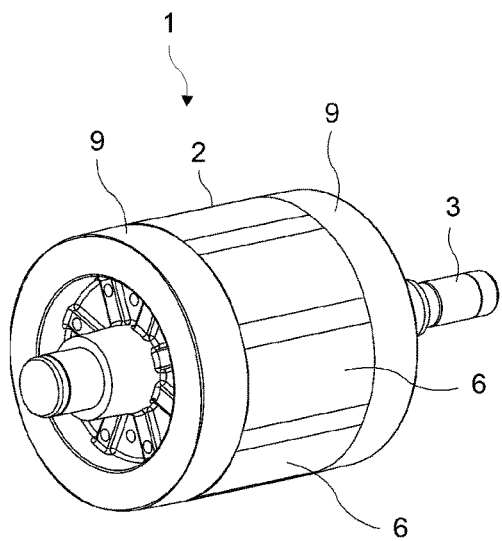
Figure 3:
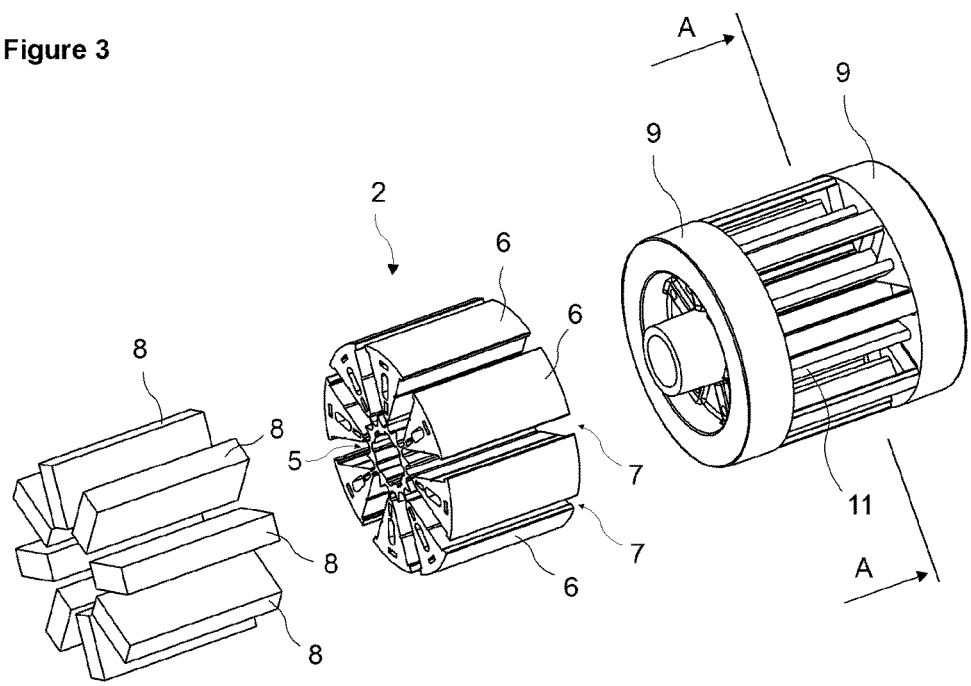
Figure 4:
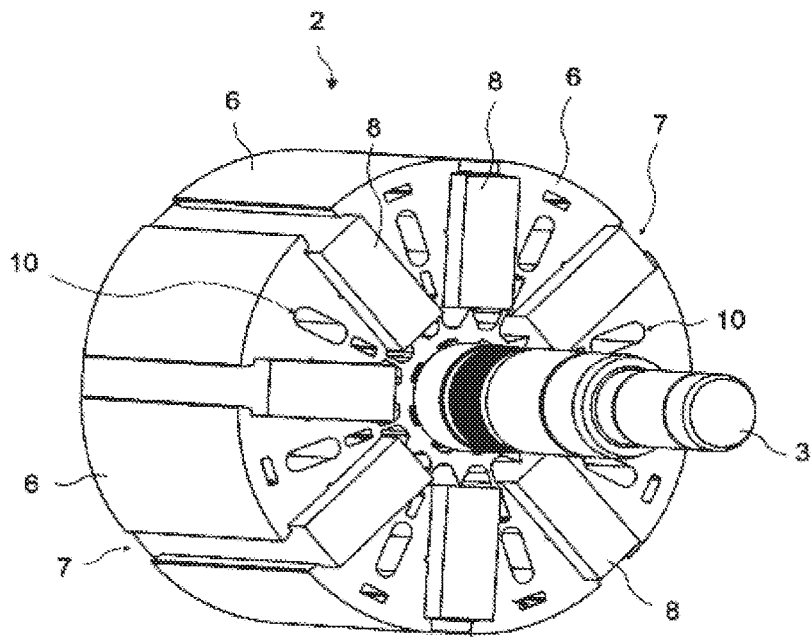
Figure 5:
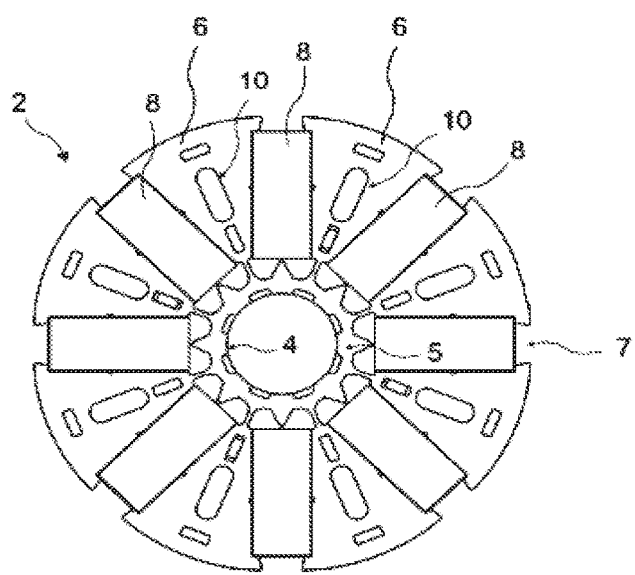
Figure 6:
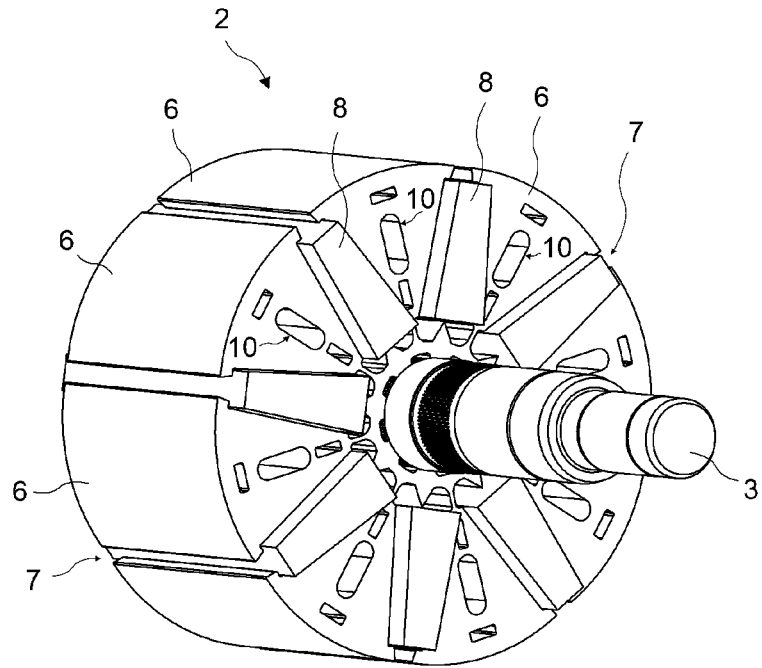
Figure 7:
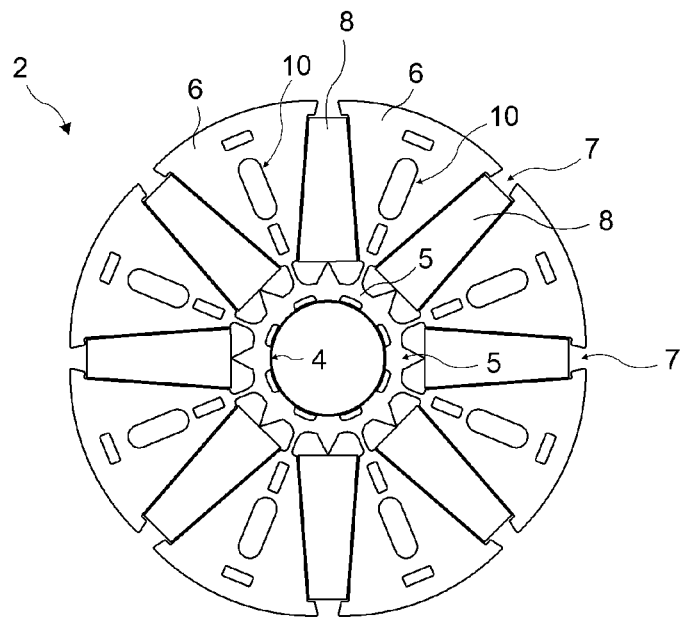
Figure 8:
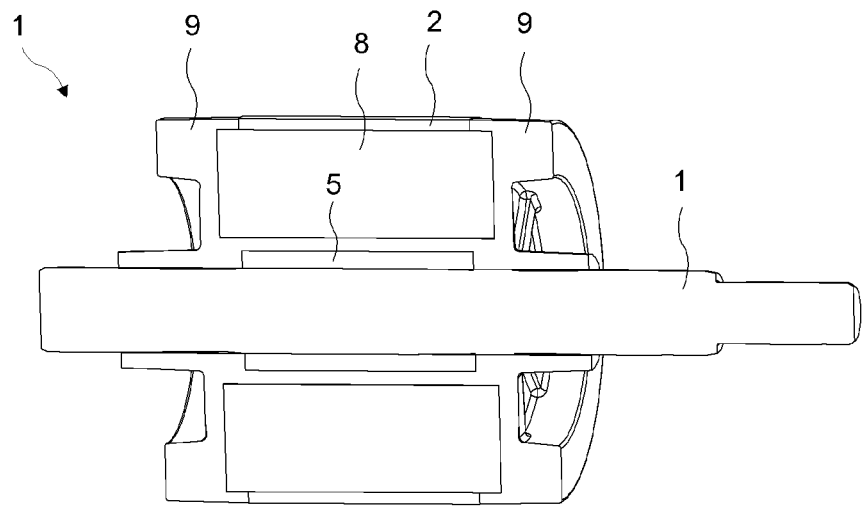
Figure 9:
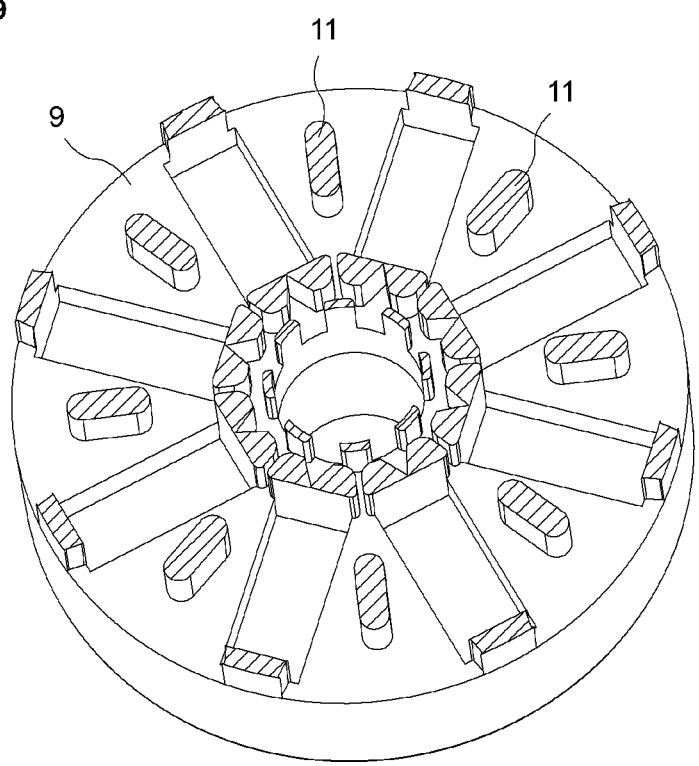

The rotor realized in order to attain the aim of the present invention is illustrated in the attached figures, where:

FIG. 1—is the schematic view of an electric motor.
FIG. 2—is the perspective view of a spoke rotor.
FIG. 3—is the exploded view of a spoke rotor.
FIG. 4—is the perspective view of a spoke rotor core.
FIG. 5—is the front view of a spoke rotor core.
FIG. 6—is the perspective view of a spoke rotor core in an embodiment of the present invention.
FIG. 7—is the front view of a spoke rotor core in an embodiment of the present invention.
FIG. 8—is the longitudinal cross-sectional view of a spoke rotor.
FIG. 9—is the view of cross-section A-A in FIG. 3.

The elements illustrated in the figures are numbered as follows:
1. Rotor
2. Core
3. Shaft
4. Shaft hole
5. Hub
6. Pole segment
7. Magnet slot
8. Magnet
9. End ring
10. Hole
11. Bar
12. Motor
13. Stator
14. Air gap The spoke-type permanent magnet rotor (1) used in the brushless direct current electric motors (12) driving the components like drum, circulation pump and discharge pump in household appliances like laundry washing and/or drying machine and dishwasher, forming the rotating part inside a stator (13) that forms the stationary part thereof and having an air gap (14) between the inner surface of the stator (13) and itself, comprises a cylindrical core (2) produced from ferromagnetic laminations or ferromagnetic powder metal, a shaft (3) that is fixed to the core (2) and forming the rotational axis of the rotor (1), a hub (5) disposed at the center of the core (2) and having a shaft hole (4) that bears the shaft (3), more than one pole segment (6) disposed all around the hub (5), more than one magnet slot (7) disposed between the pole segments (6), more than one magnet (8) tangentially magnetized, placed in the magnet slots (7) and extending outwards in the radial direction, and two end rings (9) produced from non-magnetic materials such as plastic or aluminum, fixed on the front and rear planar surfaces of the core (2) by the injection molding method and providing the balance of the rotor (1).

The rotor (1) of the present invention comprises the magnets (8), of which the length in the axial direction is longer than the length of the magnet slots (7) and of which the portions extending outwards from the front and rear planar surfaces of the core (2) are embedded into the end rings (9) (FIG. 1, FIG. 4, FIG. 6).

The front and rear end portions of each magnet (8), which is longer than the length of the magnet slots (7) in the axial direction or in other words, longer than the length of the core (2), extending outwards from the rear and front planar surfaces of the core (2) are embedded into the end rings (9) or end rings (9) are injected thereon; thus, the magnets (8) are provided to be held in a rigid structure in the core (2), the movement of the magnets (8) in the axial and radial direction is prevented and resistance to centrifugal forces is increased. The ends of the magnets (8) extending outwards from the front and rear surfaces of the core (2) create an "overhang" effect and thus the flux density directed from the magnets (8)

to the air gap (14) is increased. Flux leakage at the end portions of the magnets (8) is prevented, demagnetization risk is reduced, the torque obtained from the unit volume of the magnets (8) is increased, overheating is prevented and the motor (12) efficiency is increased.

In another embodiment of the present invention, the rotor (1) comprises the magnet slots (7) narrowing from the hub (5) outwards in the radial direction and the magnets (8) with trapezoid cross-sections placed in the magnet slots (7) (FIG. 6, FIG. 7). In this embodiment, the amount of the tangential flux acting on the air gap (14) from the magnet (8) is increased without any change in the volume of the magnet (8). The magnetic field vectors in the direction perpendicular to the radially inclined edges of the magnet (8) with trapezoid cross-sections are directed to the air gap (14), the flux density in the air gap (14) is increased and the motor (12) performance is improved.

In another embodiment of the present invention, the rotor (1) comprises more than one hole (10) with rounded edges that longitudinally hollows the pole segment (6) by passing through each pole segment (6) in the axial direction and the cross sectional length of which in the radial direction is more than its width and more than one bar (11) formed by injecting non-magnetic material into the holes (10), extending between the end rings (9) in the axial direction along the core (2), forming a cage around the hub (5) (FIG. 4, FIG. 5, FIG. 6, FIG. 7, FIG. 9).

In another embodiment of the present invention, the cross-sections of the holes (10) and the bars (11) injected into the holes (10) are oblong with rounded short edges.

In another embodiment of the present invention, the cross-sections of the holes (10) and the bars (11) injected into the holes (10) are elliptic.

The holes (10) in oblong or elliptical form with rounded edges, provide improvement in the injection of the bars (11) into the holes (10) during the process of injection molding. The bars (11) are produced by being injected into the holes (10) with agonic inner surfaces. The cage structure formed by the bars (11) is strengthened and the mechanical resistance of the rotor (1) is increased by preventing the formation of gaps in the bars (11). The cage structure formed by the bars (11) hold together the pole segments (6) and the magnets (8) in a rigid structure. Particularly, the resistance to centrifugal and tangential forces of the portions, which join the pole segments (6) and the hub (5) and which are weak in terms of mechanical resistance, is improved and the rotor (1) is prevented from disintegrating at high speeds. The noise level of the motor (12) is decreased and overheating is prevented.

In the rotor (1) of the present invention, the mechanical structure is strengthened by increasing resistance to centrifugal forces. The magnets (8) that are longer than the length of the core (2) generate the "overhang" effect known in the technique and thus the amount of the flux acting on the air gap (14) from the magnets (8) is increased and the motor (12) performance is improved.

The invention claimed is:

1. A rotor forming a rotating part of an electric motor inside a stator and having an air gap between an inner surface of the stator and itself, the rotor comprising:
    a cylindrical ferromagnetic core;
    a shaft forming a rotational axis thereof;
    a hub disposed at a center of a core and having a shaft hole that bears a shaft, more than one pole segment disposed all around the hub, more than one hole with rounded edges, wherein each hole has an agonic inner surface that longitudinally hollows the pole segment by passing through the pole segment in an axial direction, wherein a cross-sectional length of each hole in a radial direction is more than a width of the hole, more than one magnet slot disposed between the pole segments, and more than one magnet placed in the magnet slots and extending outwards in the radial direction, wherein the magnets have a length in the axial direction that is longer than a length of the magnet slots, and wherein the magnets have portions extending outwards from front and rear planar surfaces of the core; and
    two end rings and more than one bar produced from non-magnetic material by injection molding, the two end rings fixed to the front and rear planar surfaces of the core, the portions of the magnets extending outwards from the front and rear planar surfaces of the core being embedded into the end rings and surrounded by the two end rings, inner surfaces of the two end rings being flush against each surface of the portions of the magnets that extend outwards from the front and rear planar surfaces of the core, the more than one bar formed into the more than one hole and extending between the two end rings in the axial direction along the core, the rounded edges and agonic inner surfaces of the more than one hole preventing formation of gaps in the more than one bar, the two end rings and the more than one bar providing a rigid cage structure around the hub to prevent movement of the magnets in the axial direction and the radial direction and to provide resistance against centrifugal forces.

2. The rotor as in Claim 1, wherein the magnet slots narrow from the hub outwards in the radial direction and the magnets have trapezoid cross-sections placed in the magnet slots.

3. The rotor as in Claim 1, wherein the holes and the bars have cross-sections that are oblong with rounded short edges.

4. The rotor as in Claim 1, wherein the holes and the bars have cross-sections that are elliptic.

5. The rotor as in Claim 2, wherein the holes and the bars have cross-sections that are oblong with rounded short edges.

6. The rotor as in Claim 2, wherein the holes and the bars have cross-sections that are elliptic.

* * * * *